(12) United States Patent
Neuweg et al.

(10) Patent No.: US 8,620,725 B2
(45) Date of Patent: Dec. 31, 2013

(54) SYSTEM AND METHOD FOR ENHANCING CREDIT AND DEBT COLLECTION

(76) Inventors: Ryan A. Neuweg, Kansas City, MO (US); David E. Bauer, Bailey, CO (US)

( * ) Notice: Subject to any disclaimer, the term of this patent is extended or adjusted under 35 U.S.C. 154(b) by 425 days.

(21) Appl. No.: 12/819,913

(22) Filed: Jun. 21, 2010

(65) Prior Publication Data

US 2010/0324966 A1 Dec. 23, 2010

Related U.S. Application Data

(60) Provisional application No. 61/218,743, filed on Jun. 19, 2009.

(51) Int. Cl.
*G06Q 40/00* (2012.01)

(52) U.S. Cl.
USPC .......................................... 705/7.38

(58) Field of Classification Search
USPC .......................................... 705/7.38
See application file for complete search history.

(56) References Cited

U.S. PATENT DOCUMENTS

| | | | |
|---|---|---|---|
| 6,456,983 B1 * | 9/2002 | Keyes et al. | 705/36 R |
| 7,191,150 B1 | 3/2007 | Shao et al. | |
| 7,254,558 B2 | 8/2007 | Hinkle et al. | |
| 7,401,050 B2 | 7/2008 | O'Neill | |
| 7,403,923 B2 | 7/2008 | Elliott et al. | |
| 7,519,553 B2 | 4/2009 | Abe et al. | |
| 7,536,348 B2 | 5/2009 | Shao et al. | |
| 7,546,262 B1 | 6/2009 | Ferguson et al. | |
| 7,685,061 B2 | 3/2010 | Haworth et al. | |
| 7,698,206 B2 | 4/2010 | Mostowfi | |
| 7,797,230 B1 | 9/2010 | Barie et al. | |
| 7,818,228 B1 | 10/2010 | Coulter | |
| 7,827,100 B2 * | 11/2010 | Singh | 705/38 |
| 2007/0043659 A1 * | 2/2007 | Kass et al. | 705/38 |
| 2007/0043661 A1 * | 2/2007 | Kass et al. | 705/38 |
| 2007/0156557 A1 * | 7/2007 | Shao et al. | 705/35 |
| 2008/0133315 A1 * | 6/2008 | Singh | 705/10 |
| 2008/0189202 A1 * | 8/2008 | Zadoorian et al. | 705/37 |
| 2010/0161459 A1 * | 6/2010 | Kass et al. | 705/30 |
| 2010/0324966 A1 * | 12/2010 | Neuweg et al. | 705/9 |

FOREIGN PATENT DOCUMENTS

WO WO2007022510 * 2/2007 .............. G06Q 40/00

OTHER PUBLICATIONS

"International Search Report and Written Opinion", PCT/US2010/039378, Feb. 6, 2012.

* cited by examiner

*Primary Examiner* — Jonathan G Sterrett
*Assistant Examiner* — Folashade Anderson
(74) *Attorney, Agent, or Firm* — Law Office of Mark Brown, LLC; Mark E. Brown; Christopher M. DeBacker

(57) ABSTRACT

A system and method for enhancing assignment of debtor accounts to a plurality of collection parties is presented. The preferred embodiment is capable of optimizing the way by which individual performance entities are assigned to collect on actionable individual debtor accounts by a creditor. An analysis solution uses algorithms to analyze gathered data and to provide a score to each collection party based upon the traits of the individual collection parties, debtor accounts, creditor, externally acquired data, and constraints upon all of the parties involved. The system and method are also capable of enhancing an individual borrower's credit score depending on the risk involved with providing credit to that particular borrower based upon the collectability upon default.

3 Claims, 6 Drawing Sheets

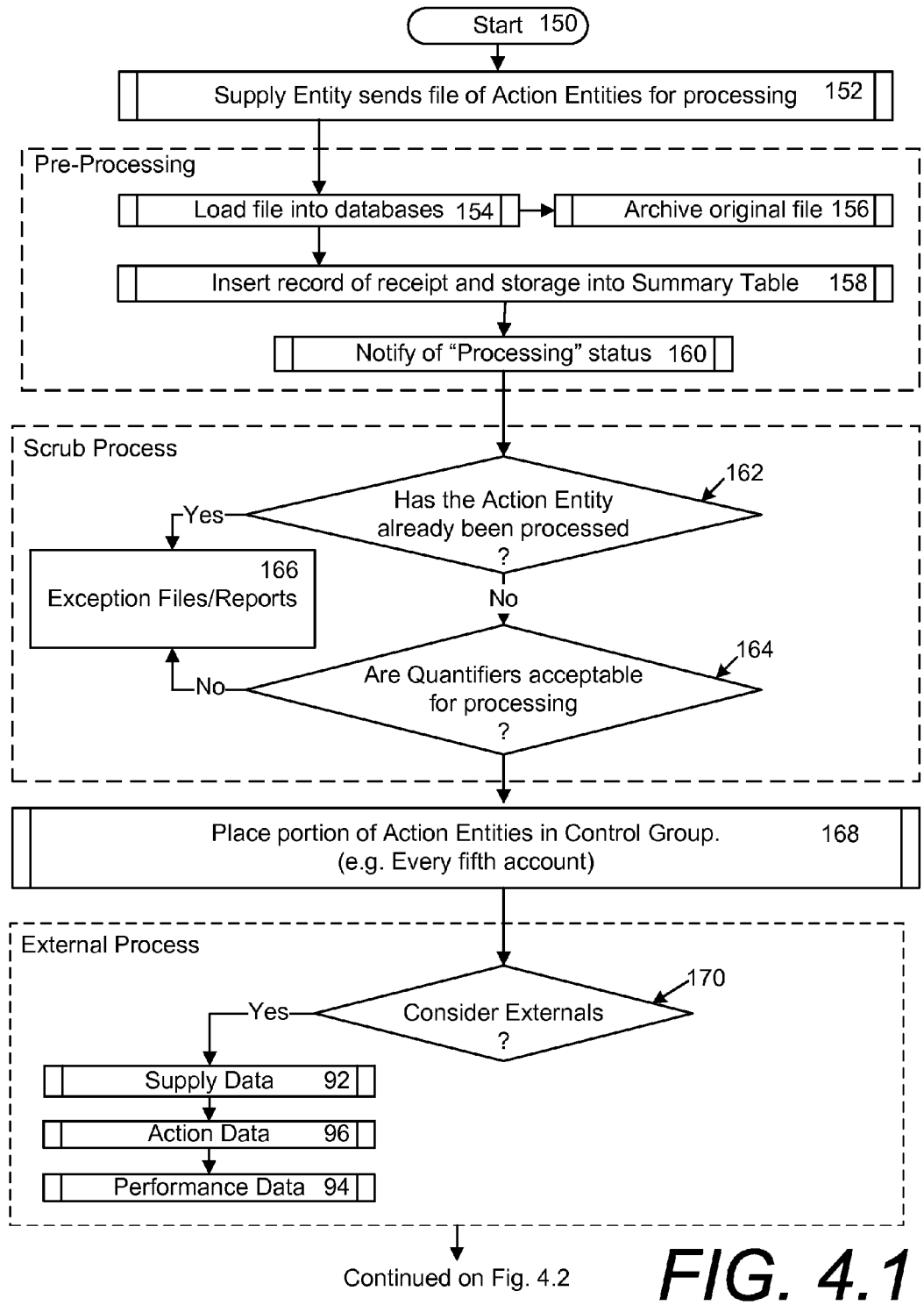
FIG. 4.1

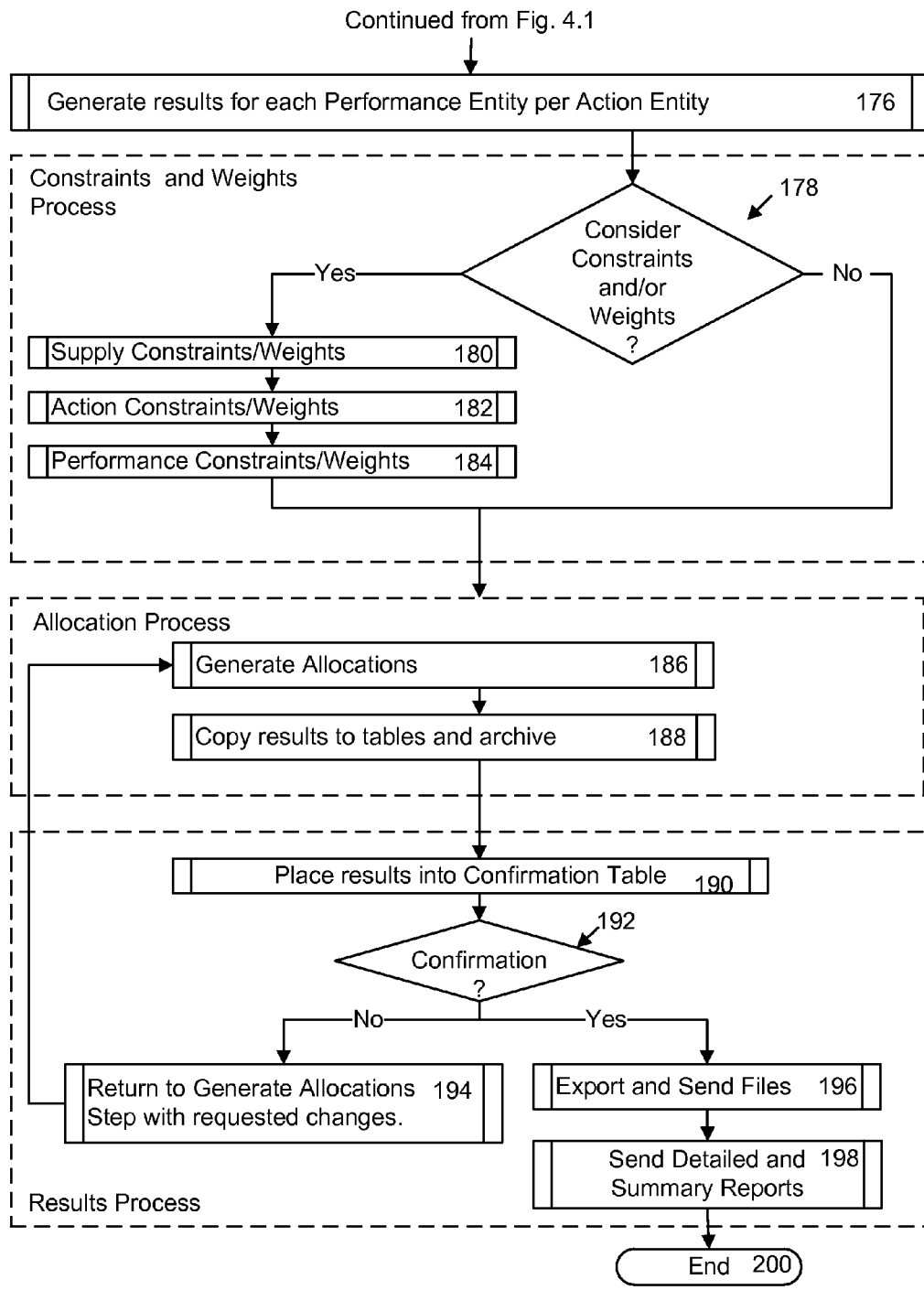
FIG. 4.2

SYSTEM AND METHOD FOR ENHANCING CREDIT AND DEBT COLLECTION

This application claims priority in U.S. Provisional Patent Application No. 61/218,743, filed Jun. 19, 2009, which is incorporated herein by reference.

BACKGROUND OF THE INVENTION

1. Field of the Invention

The present invention relates generally to a system and method for enhancing the process by which creditors provide credit and collect debt, and in particular to a system and method for managing debt collection parties and for enhancing the credit score of individual parties seeking credit based on the traits of the individual debt and the debt collection parties involved with a creditor.

2. Discussion of the Related Art

Various systems and methodologies have previously been developed for managing the debt collection process and the way in which companies provide credit to individuals. Credit scores, such as the Fair Isaac Corporation standard FICO score, Dunn and Bradstreet's DNB score, and the Vantage Score, are the basis for which credit is supplied at present. An individual's ability to acquire credit depends upon the FICO score as reported by the "big three" credit agencies Equifax, Experian and Trans Union. This credit score not only applies to an individual's ability to acquire credit, but companies, corporations, and other entities as well.

Credit is central to all major financial transactions in today's economy. Most entities do not possess enough cash on hand for all transactions, and so they rely on credit to make purchases of inventory, personal items, buildings, equipment, and other items that are a normal part of daily life and business. The credit industry is essential to the economic world of today. Many external elements play a role in credit, such as the present economy, stock prices, and the willingness of banks to lend. Likewise, the responsibility of borrowers plays a large role in the ability to receive credit. A borrower's prior conduct, financial standing, and location, along with other traits, play a role in the acquisition of credit from a creditor.

Banks and credit card companies provide lending and credit services to individual entities. When those individuals default on their payments, the lending companies seek the aid of collection parties to collect from these defaulting parties. Collection parties compete with one another to receive these collection accounts from the lending companies. Debt can have many traits, such as the amount, the location of the debtor, and whether it is a primary, secondary, or tertiary debt, depending on whether another company has attempted to collect the debt in the past. Each collection party has its strengths and weaknesses, and the lending parties seek to provide the debts to the collection parties in a way that would best ensure the debt is collected.

When an entity who has been provided credit defaults on their payments, collection parties are hired to seek out and collect on the debt. Often several collection parties will compete for the right to collect on debts owed to the original credit provider. Certain techniques and practices are currently used to best assign owed debts to individual collection parties. One such method is known as the Champion Challenger system. In this system, the "best performers" are assigned the majority of debt collection assignments. The Champion Challenger system does not employ a statistical analysis performed to determine which debt collection party is assigned which piece of debt, and therefore no way to determine if the assignee will perform optimally when collecting the particular debts assigned. Other existing analysis systems attempt to look at how likely a piece of debt is to be collected depending on the debtor's location, the amount of the debt, and the reason for default. This system fails to take into account the strengths and weaknesses of the collection parties fighting for the particular piece of debt and match the competing debt collection parties to pieces of collectable debt according to those strengths and weaknesses. Still other statistical models exist where collection parties and creditors can score an individual debt on the likelihood of collection; however these models fail to match the traits of the various parties involved in a way that will improve the ability to collect.

The invention presented herein seeks to focus on the traits of all of the parties involved in a credit lending and/or debt collecting transaction. By comparing important traits of the debt itself, all of the debt collection parties seeking to collect on the debt, and the lending party itself, the present invention determines which collection party should be assigned which debt. Alternatively, the present invention can help to modify a borrower's credit score if it can be determined that the individual possesses certain traits that will make a default easier or more difficult to collect. Using known statistical algorithms, plus algorithms developed and implemented specifically for this invention, or unknown algorithms yet to be discovered, the present invention supplies credit and lending companies a more economic method for providing credit ratings and for collecting debt.

Heretofore there has not been available a transaction management system and method with the advantages and features of the present invention.

BRIEF DESCRIPTION OF THE INVENTION

In the practice of one aspect of the present invention, a system is provided for managing the way creditors provide credit and collect debt. A system and method is presented wherein businesses can submit their past due accounts receivable and compare collection parties to select the best one for them, based on a variety of characteristics. The preferred embodiment of the present invention will take the chosen traits of a creditor, a number of debt collection parties, and individual pieces of debt, and determine which collection party is best suited for collecting a particular piece of debt.

An alternative use of the present invention allows a creditor providing credit to enhance or decrease a borrower's credit score based upon the collectability of their debt. As an example, a borrower who is determined to be a low likelihood of collection recovery if default occurs could have points reduced from their credit score, whereas a borrower who is determined to be of a high likelihood for collection recovery could have their credit score increased. By comparing the traits of the collection parties available and of the particular borrower in question, the present invention will determine the risk involved with lending credit to a particular borrower, and in turn the ability of the lender, or the lender's collection assignee, to collect that debt using the collection parties available.

BRIEF DESCRIPTION OF THE DRAWINGS

The drawings constitute a part of this specification and include exemplary embodiments of the present invention and illustrate various objects and features thereof.

FIG. 4.1 is a flowchart demonstrating a method of practicing the present invention.

FIG. 4.2 is a continuation of the flowchart of FIG. 4.1 demonstrating a method of practicing the present invention.

DETAILED DESCRIPTION OF THE INVENTION

Figure 1:
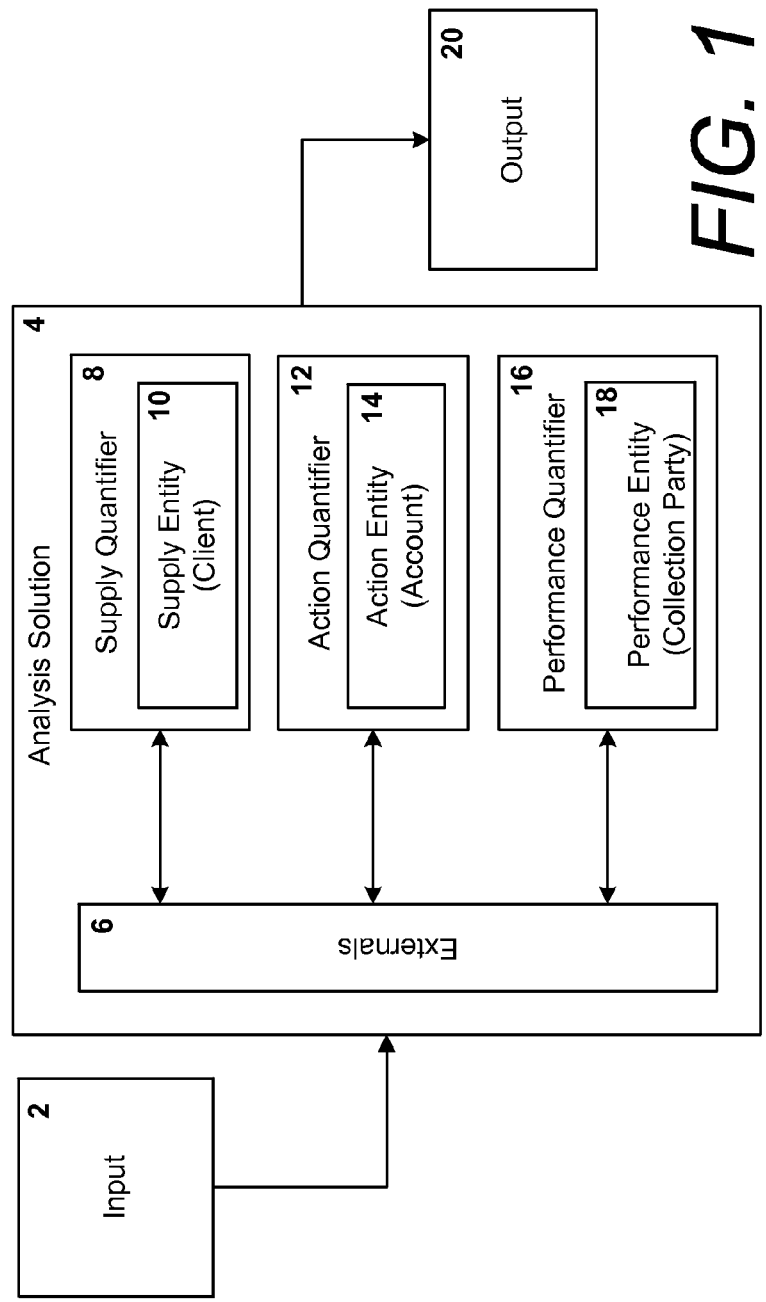
FIG. 1 is a block diagram showing the flow of data into an embodiment of the present invention, with an output resulting.

As required, detailed embodiments and/or aspects of the present invention are disclosed herein; however, it is to be understood that the disclosed embodiments/aspects are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, an input 2 enters into an analysis solution 4, resulting in an output 20. In one embodiment of the present invention, the input 2 includes data relating to debts owed to a supply entity (client) 10, the traits of that entity, collected data on a number of performance entities (collection parties) 18, including their individual traits, and data pertaining to a particular action entity (account) 14. In a preferred embodiment, the action entity 14 is a particular piece of debt owed to the supply entity 10.

I. DEBT COLLECTION ENHANCEMENT SYSTEM

FIG. 1 demonstrates how the input 2 data flows into the analysis solution 4 and results in an output 20. In the preferred embodiment, the input 2 is a collection of data supplied by a supply entity 10. The supply entity 10 in the preferred embodiment refers to a client, typically a credit lending company, debt buyer, or any party seeking to improve the efficiency of its debt collection practice. Other parties involved include an action entity 14, typically a piece of debt or a debtor account, and a number of performance entities 16, such as debt collection parties, law firms or individual collectors. The client 10 provides particular input 2 into the analysis solution 4. Additional input 2 can be added from additional databases common to the analysis solution 4, from the other parties 14, 18, or from other known databases.

The analysis solution 4 takes the input 2 from the client 10 and combines it with additional inputs 2, including externals 6, supply quantifiers 8, action quantifiers 12, and performance quantifiers 16. The quantifiers 8, 12, 16 include characteristic traits of the three interacting parties involved in the transaction, including the client 10, the account debt 14, and a number of individual collection parties 18. Each quantifier 8, 12, 16 may include a number of traits which will affect how easily the debtor account 14 can be collected on. Externals 6, which include all external influences on the output 20, are optionally considered by the analysis solution 4. Once the input is considered according to the existing quantifiers 8, 12, 16, and the externals 6, the analysis solution 4 produces an output 20. This output 20 is used by the client 10 to allocate each debtor account 14 to individual collection parties 18.

Figure 2:
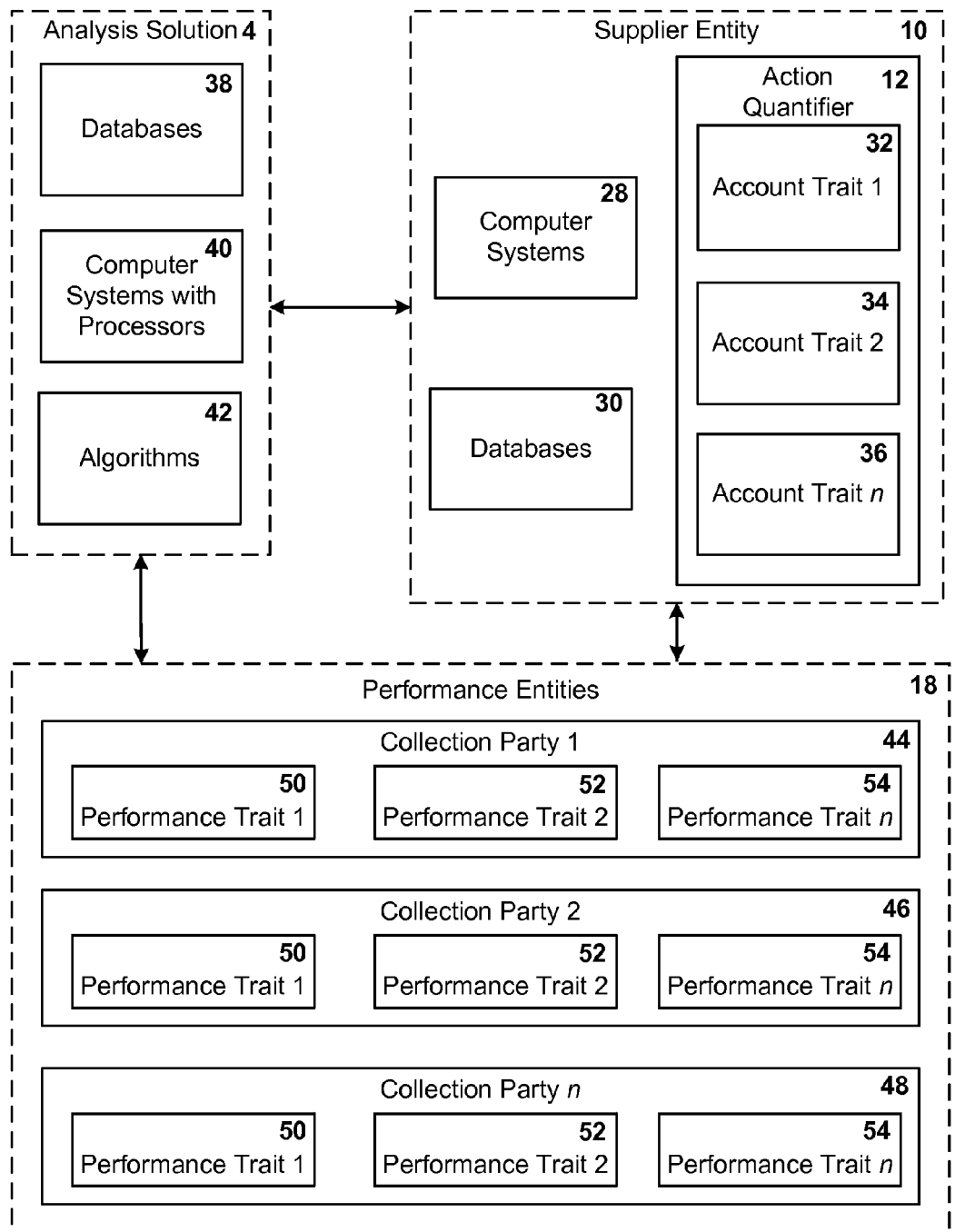
FIG. 2 is a block diagram demonstrating the relationship between three parties forming an embodiment of the present invention.

FIG. 2 demonstrates the interaction between the supplier entity 10, the performance entities 18, and the analysis solution 4. In a preferred embodiment, the supplier entity (client) 10 includes a variety of computer systems 28 and databases 30 for containing and transmitting data relating to debt collection. The computer systems 28 may include such systems as an accounting system, a server, and various other computer systems for use in the supplier entity's 10 practice of its business. The computer systems 28 link to relevant databases 30, including a database containing information on all debtor accounts 14, a database containing information on all performance entities 18 used by the supplier entity 10, and other databases. In particular, the supplier entity 10 contains a database 30 containing account traits 32, 34, 36 associated with every debt account 14 owed to the supplier entity 10. All relevant data known to the supplier entity 10 is transferred to the analysis solution 4 so that a complete output 20 will result.

The performance entities 18 refer to a number of collection parties 44, 46, 48. Each collection party 44, 46, 48 is characterized by a number of different performance traits 50, 52, 54. These performance traits 50, 52, 54 are either transmitted to the supplier entity 10 and stored in a relevant database 30, or are transmitted directly to the analysis solution 4 from the performance entities 18.

The analysis solution 4 includes a number of databases 38 for containing all received data, including externals 6, account traits 32, 34, 36, performance traits 50, 52, 54, and all other quantifiers 8, 12, 16 relevant to the particular account debts 14 owed to the supplied entity 10 and performance entities 18 used by the supplier entity 10. The analysis solution further includes a number of computer systems with suitable processors 40 for analyzing received data and running the appropriate algorithms 42 to obtain an output 20. The algorithms 42 employed by the analysis solution 4 may be any suitable algorithm for calculating statistical information using the received data. Appropriate statistical models include Naive Bayes or other forms of Bayesian statistics, regressive models, neural networks, decision tree, clustering, and any other appropriate statistical model for analyzing received data.

The purposes of the algorithms 42 is to break down all received data relevant to the performance entities 18, the action entities 14, the supplier entity 10, all externals 6, and any other relevant data, into tiers. As an example, the algorithms 42 will take the past performance of each of the performance entities 18 and break them down into five tiers. All other performance traits 50, 52, 54 will be broken down into the same number of tiers, and each performance entity 18 will be sorted accordingly. Each account trait 32, 34, 36 will then be analyzed and sorted in a similar manner. The analysis solution will then assign the appropriate debtor accounts 14 to the performance entities 18 based on how the sorted account traits 32, 34, 36 compare to the performance traits 50, 52, 54 of the performance entities 18. The traits or input data pieces that are acquired may optionally be weighted, depending on the supply entity's 10 preferences. For instance, the supply entity may wish to place more weight on the past performance of a performance entity 18, rather than on its location.

In addition to individual pieces of data used for increasing efficiency, constraints exist in the system and may be considered in order to satisfy the business strategy of the supply entity 10. These constraints may include the number of debt collection accounts a particular debt collection party may collect on, the special nature of the debt asset in question, or any element that is not a distinct measurable trait, but that affects who may collect upon a debt. These considerations allow the supply entity 10 to assign its debtor accounts 14 in the way most matching the supplier's desired strategy.

Figure 3:
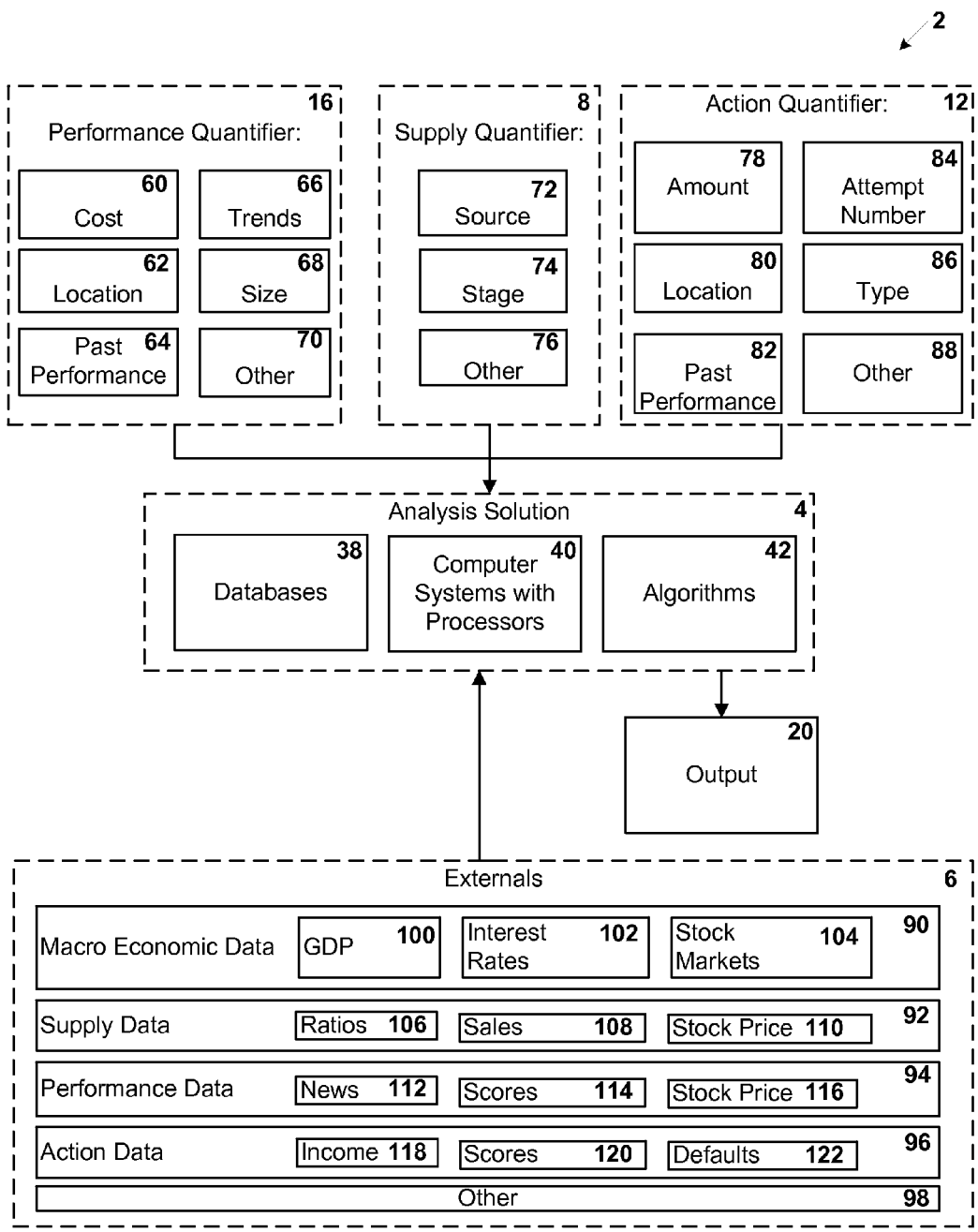
FIG. 3 is a block diagram demonstrating the flow of data during the practice of an embodiment of the present invention.

FIG. 3 demonstrates the flow of the input 2 through the analysis solution 4, resulting in an output 20. As mentioned above, all parties submitting input 2 to the analysis solution 4 include specific quantifiers 8, 12, 16. These quantifiers are typically a number of traits or elements defining each party with respect to one another. The supply entity 10 includes supply quantifiers 8, such as source data 72, stage 74 of the action entity 14, or other data 76 relevant to the analysis solution 4. In the preferred embodiment, where the supply entity 10 is a creditor and the action entity 14 is a debtor account, the source data 72 includes where the account has been sourced from and the historical treatment of the account by the creditor. This may affect constraints on a particular account if, for example, the action entity 14 is a corporate account that is to be handled more carefully than standard pieces of debt. The stage 74 of the action entity 14 refers to work that has been performed on the account by the creditor. This may include previous collection attempts of the debt and the performance entities 18 previously used by the creditor to collect on the debt. Source 72 and stage 74 data refer particularly to elements of the account specific to the creditor and not to the account itself.

The action entity 14 possesses action quantifiers 12. In the preferred embodiment, where the action entity 14 is a debt to be collected, the action quantifiers 12 may include debt amount 78, location 80 of the debtor, past performance 82 of the debtor, collection attempt number 84, type of debt 86, and any other 88 traits relevant to the collection of the debt account. In the preferred embodiment, debt type 86 may include what type of credit was extended to the debtor party, and therefore what type of debt is being handled. This is important if, for example, the action entity 14 is a corporate account that is to be handled more carefully than standard pieces of debt. The attempt number 84 of the action entity 14 refers to whether a particular debt has had previous attempts of collection. A first-attempt collection, or primary stage, will be handled by different performance entities 18 than will a secondary or tertiary collection stage. All of the action quantifiers 12 affect how each performance entity 18 will perform if assigned to collect on the action entity 14, and are vital to efficiently assigning the account to be collected to the collection party best suited to collect that particular account.

The performance entity 18 possesses performance quantifiers 16. In the preferred embodiment, where the performance entity 18 is a collection party, the performance quantifiers 16 may include the cost 60 of services, location 62 of the collection party, past performance 64 of debt collection, trends 66 according to different types of debt collection, the size 68 of the collection party, and other 70 relevant traits relevant to the collection of the debt account. The performance 64 of debt collection may be further broken down depending on the types 86 of debtor accounts previously collected on by the collection party. Trends 66 and past performance 64 may be broken down further into time periods of each, such as past month, past six months, past year, and lifetime of the collection party.

These inputs 2 are fed into the analysis solution 4 along with externals 6. Externals 6, as briefly explained above, include outside influences on the analysis solution 4 that are not supplied by the supply entity 10, action entities 14, or performance entities 18. Externals 6 are optional input 2 traits that will affect the output 20. In the preferred embodiment where the supply entity 10 is a creditor, the action entities 14 are debtor accounts, and the performance entities 18 are collection agencies, externals 6 may include macro economic data 90, supply data 92, performance data 94, action data 96, and other relevant external sources of data 98.

Macroeconomic external data 90 may include such elements as the country's gross domestic product (GDP) 100, standard interest rates 102, and stock market 104 prices and trends. External supply data 92 may include supply entity 10 traits not included in the supply quantifiers 8 for debt collection, such as ratios 106, sales data 108, and supply entity stock price 110. Similarly, external performance data 94 will include performance entity 18 traits not included in the performance quantifiers 16 for debt collection, such as news reports 112 about each performance entity 18, externally presented quality scores 114 for the entity, and the entity's stock price 116. The action entities 14 also include external action data 96, such as entity income 118, externally presented quality scores 120 such as FICO, and other defaults 122 besides the current default the creditor is attempting to collect on.

As explained above, the inputs 2, including all quantifiers 8, 12, 16, and externals 6, are fed into the analysis solution 4 and processed according to the chosen algorithms 42. In the preferred embodiment, the creditor is seeking to allocate its various debtor accounts to a number of collection parties. By analyzing the input data 2, the analysis solution 4 will determine which collection parties have historically had the most success collecting specific types of debtor accounts. Instead of randomly assigning a number of accounts to each collection party based solely on each party's relative size and capability of actively collecting on debtor accounts, the creditor will be able to assign specific debtor accounts to collection parties who are best suited for collecting those debts.

For example, under different methods for account allocation, a particular collection party may be randomly assigned 50% of a creditor's debtor accounts. These accounts will be allocated to the collection party either randomly or based solely on the types of debts. Using the present invention, however, the same collection party will likely be assigned the same percentage of debtor accounts, but the creditor will instead assign those accounts determined by the analysis solution 4 as having the best chance of being collected by that particular collection party.

The collection party that best satisfies the analysis solution for a particular debtor account may not always be assigned that account for collection. Constraints may come into play where a collection party does not have the resources to collect on additional debtor accounts, so the next highest rated collection party may receive the account. Similarly, some traits may be weighted higher by the creditor than other traits, such as collection party location with respect to debtor account location. This may also result in the account being assigned to a collection party that did not receive the highest correlation to that debtor account.

II. METHOD OF PRACTICING DEBT COLLECTION ENHANCEMENT SYSTEM

FIGS. 4.1 and 4.2 show a flow chart demonstrating the practice of a method of the present invention. A series of steps are presented that will lead input data 2 through the analysis solution 4, resulting in an output 20. Some steps may be optional, but may lead to more refined results.

The method starts at 150. The first step in the practice of a preferred embodiment of the present invention involves pre-processing. Here, data is collected for use by the analysis solution 4. The supply entity sends a file containing the action entities in its position to the analysis solution at 152. This file may also include gathered action quantifier 12 data that will be used by the analysis solution 4. The action entities file is loaded into the analysis solution database at 154, and an optional backup archive of the original file is made at 156 and stored for later use. Next, the process must insert a record of receipt and storage of the file into a summary table at 158 and notify all involved parties of the "processing" status at 160.

The next phase is a scrub process, where collected data is checked to determine if it is useable for the analysis solution 4. A check is performed for each action entity 14 to determine whether each has been processed at 162. A second check is performed to determine if there are acceptable quantifiers available for processing the input data at 164. If a response of "yes" is returned for a particular action entity on check 162 or a response of "no" is returned for a particular action entity on check 164, an exception file or report is issued at 166.

In a preferred embodiment, a control group is created at 168. After a predetermined number of accounts are passed through from the scrub process phase, an account will be placed into a control group. For example, after four accounts have passed through the scrub process, the fifth account will be placed into a control group. This control group is used to determine whether the analysis solution is performing its job and optimizing the placement of accounts to collection parties. The results of the control group accounts can be compared with the analysis solution 4 output 20. If there is not a significant increase in efficiency shown by the output solution, there may be an error in the process, and so checks can be performed manually.

As stated above, externals 6 can be optionally considered when introducing input data 2 into the analysis solution 4. Externals are considered at 170, and if externals are not considered, the process continues to the next phase. If externals are considered, the external process phase considers external supply data 92, external action data 96, and external performance data 94. Other external data sources may optionally be included.

Next, in FIG. 4.2, the analysis solution 4 will generate results for each performance entity per action entity at 176. Essentially, each performance entity 18 is given a score or report for each action entity 14 as determined by the analysis solution 4 from comparing the various traits and data inputs. Constraints or weights are optionally considered at 178. As briefly explained above, constraints are additional considerations that may affect which performance entity 18 is assigned which action entities 14. For example, there may be an employee size constraint on the performance entity. Even if the performance entity is best suited to handle fifty action entities, it may be limited to only forty because of employee number constraints. Another example occurs when the action entity is a corporate account or is otherwise handled with special procedures. In such cases, certain performance entities may have been trained to deal with these special action entities and will receive priority when being assigned such action entities.

In addition to and/or instead of constraining data, the input data may merely be weighted at 178. As briefly explained above, weighing the data allows the supply entity 10 to customize the dataset according to which performance quantifiers 16, action quantifiers 12, or supply quantifiers 8 it wants to have the most impact. If constraints or weights are considered at 178, the solution will consider supply constraints at 180, action constraints at 182, and performance constraints at 184. Otherwise these constraints will be skipped, and the method proceeds to the allocation process phase.

During the allocation process phase, the analysis solution 4 will generate allocations 186, wherein each action entity 14 will be assigned to a performance entity 18 that has been determined to have the best chances for collecting on the action entity. These results are then copied to tables and archived at 188 for backup purposes. The results are then placed into a confirmation table at 190, and a confirmation check is performed at 192. This confirmation check may be automatically performed by software or it may be manually performed by the supply entity 10. If confirmation is not received at 192, the process returns to the generate allocations step at 194 considering the changes requested during the confirmation check.

If confirmation is granted at 192, the output is exported to a file that is saved and sent to the supply entity at 196. Along with the files, detailed and summary reports are sent to the supply entity at 198. These reports contain the data that was used to allocate the action entities to the performance entities, detailed descriptions on any allocations that occurred because of constraints, and any other important information that the supply entity may want to consider when reviewing the allocation list. The process then ends at 200.

III. ALTERNATIVE EMBODIMENT CREDIT ENHANCEMENT

The preferred embodiment discussed above describes a system and method for enhancing debt collection practices by optimizing the allocation of debtor accounts to collection parties using an analysis solution. An alternative use of the same or similar information can result in enhancing or decreasing an individual's credit score. This is done by determining how easy or difficult it would be for a collection party known to the analysis solution database and/or supply entity to collect on an individual's debt if they were to default. If the individual is shown to correlate with a number of collection parties, that individual may receive a higher credit score due to a lower risk of collection upon default. The opposite is true if it is shown that the individual would be difficult to collect against if default were to occur.

Figure 5:
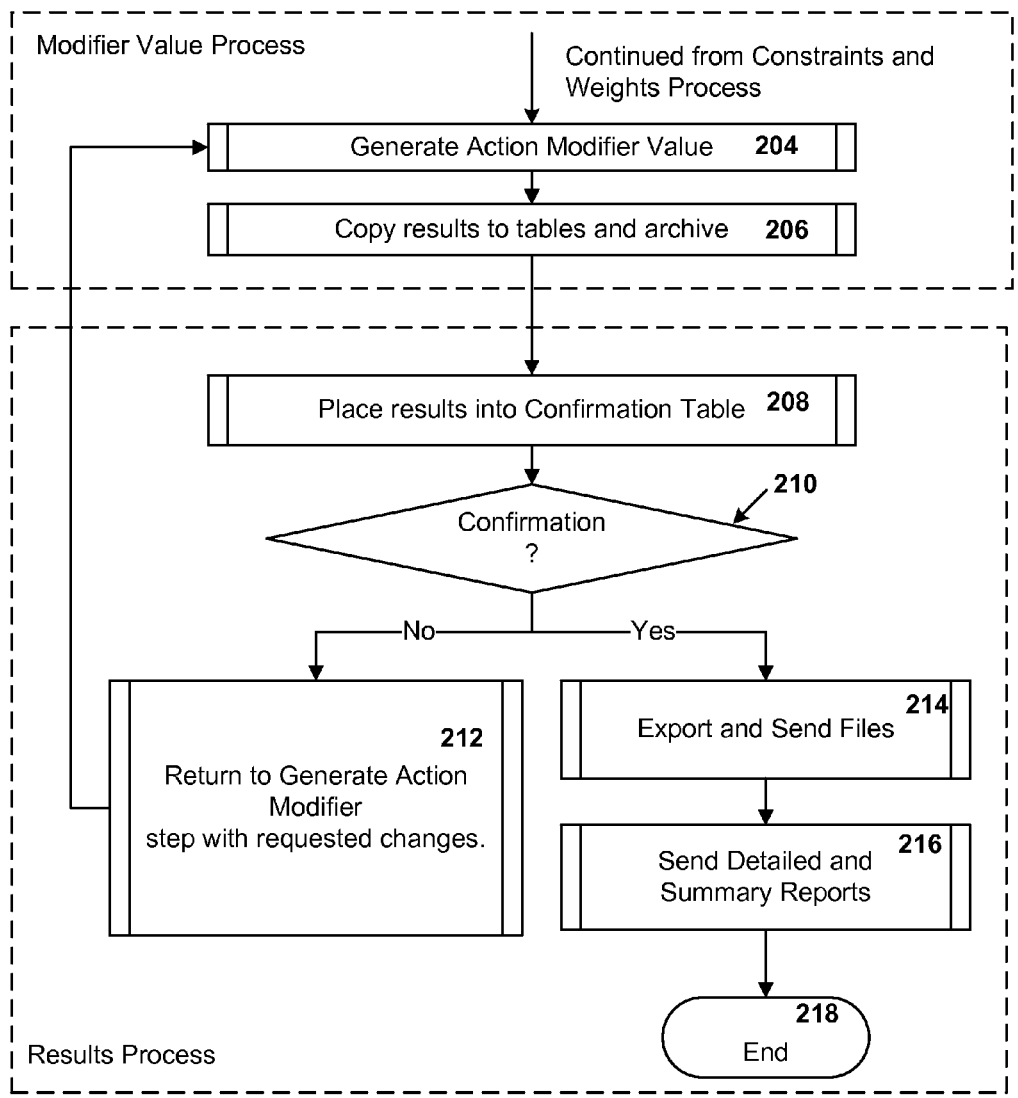
FIG. 5 is a continuation of the flowchart of FIGS. 4.1 and 4.2 demonstrating a method of practicing an alternative embodiment of the present invention.

FIG. 5 expands upon the flowchart shown in FIGS. 4.1 and 4.2, further demonstrating the practice of a method of this alternative embodiment. However, instead of allocating accounts to collection parties, the practice of a method of the alternative embodiment includes generating an action modifier value at 204. These results are copied to tables and archived at 206 and placed into confirmation tables at 208 before a confirmation check at 210. As before, confirmation can be performed by the software automatically or manually by the supply entity. If confirmation is not granted at 210, the process returns to generate the action modifiers again based on the requested changes made at 212.

Upon final confirmation, the files are exported, saved, and sent to the supply entity at 214, followed by the sending of detailed and summary reports at 216. This data helps a supply entity, typically a creditor, determine what credit score to assign to an individual seeking credit. The process ends at 218.

IV. CONCLUSION

While the present invention would typically be used for the embodiments as described above, the previous examples are not intended to limit the present invention in any way. It should be noted that the present invention could be used as a system or method for establishing a new credit score. Based on the quantifiers, externals, and other data sources acquired by the present invention, a new credit score can be provided that would be based on more information than existing credit scores.

It is to be understood that while certain embodiments and/or aspects of the invention have been shown and described, the invention is not limited thereto and encompasses various other embodiments and aspects. The preferred and alternative embodiments outlined herein are examples of two ways to practice the present invention, but are not intended to limit the practice of the present invention in any way.

Having thus described the invention, what is claimed as new and desired to be secured by Letters Patent is:

1. A method of enhancing the allocation of account entity debtor accounts to performance entity collection parties from an input data set entered into an analysis computer system including at least one computer system with a suitable processor, a database accessible to the processor, and an algorithm for allocating said debtor accounts, which method comprises the steps of:

submitting supply entity creditor data traits from a supply entity creditor to said analysis computer system;

submitting account entity debtor account data traits from at least one debtor account to said analysis computer system;

submitting performance entity collection party performance data traits from at least two collection parties to said analysis computer system;

acquiring external data inputs comprised of data from sources external to said supply entity creditor, performance entity collection parties, account entity debtor accounts, and said analysis computer system, said external data inputs possessing external data traits from macro-economic data, supply data, performance data and action data;

inputting said external data inputs to said analysis computer system;

acquiring at least one constraint comprising data from said supply entity, performance entities, or account entities not contained by said supply qualifiers, performance qualifiers, or account qualifiers;

providing at least one supply entity creditor computer system capable of communicating with said analysis computer system;

providing at least one supply entity creditor data base containing a list of account entity debtors and a list of said performance entity collection parties;

transferring said list of debtor account entities and performance entity collection parties to said analysis computer systems and databases;

configuring said analysis computer system with said algorithm to compile input data from said creditor data traits, debtor account data traits, collection party data traits, and external data traits into said analysis computer system databases;

configuring said algorithm to compare said compiled input data and transform the input data into output data;

configuring said algorithm to reallocate each of said action entity debtors to one of said performance entity collection parties based on said output data in consideration of said constraints;

assigning a collection party score to each of said performance entity collection parties for each debtor account;

allocating said debtor accounts to each of said collection parties based upon the assigned score in consideration of said constraints;

configuring said algorithm to utilize said external data inputs to assign said collection party scores and to allocate said action entity debtor accounts among said performance entity collection parties;

selecting a debtor account seeking credit from said creditor;

adjusting said debtor account's credit score according to analysis computer system output;

selecting an account entity debtor account seeking credit from said creditor;

generating an action modifier value based on degree of difficulty for said collection party known to the analysis solution database and/or supply entity to collect on said debt account in the event of default;

correlating said debt accounts to collection entities and adjusting credit scores based on said correlation;

allocating said debtor accounts to each of said collection parties based upon the assigned collection party score in consideration of said constraint;

adjusting said debtor account's credit score according to analysis computer system output;

performing a confirmation check;

if confirmation not granted: requesting changes; regenerating action modifiers based on said changes; and resubmitting said action modifier values to said confirmation tables; and granting confirmation upon compliance with said action modifier values to said confirmation tables.

2. The method of claim 1, comprising the additional steps:

selecting a debtor account seeking credit from said creditor;

adjusting said debtor account's credit score according to analysis computer system output.

3. The method of claim 2, comprising the additional steps:

compiling all gathered and sorted input data; and providing a credit score to an individual seeking credit from the creditor based on said input and output data.

* * * * *